United States Patent [19]

Carter

[11] 4,172,886
[45] Oct. 30, 1979

[54] CARBOHYDRATE CONVERSION TO CARBON MONOXIDE AND SYNTHETIC COAL

[75] Inventor: Melvin K. Carter, Saratoga, Calif.

[73] Assignee: Envirotech Corporation, Menlo Park, Calif.

[21] Appl. No.: 662,073

[22] Filed: Feb. 27, 1976

[51] Int. Cl.² .............................................. C01B 31/18
[52] U.S. Cl. .................................. 423/415 A; 423/245; 423/249; 252/422; 44/1 R
[58] Field of Search .................. 423/415 A, 445, 449; 44/1 R, 1 B, 1 D, 1 E, 16; 252/421, 422

[56] References Cited

U.S. PATENT DOCUMENTS

| | | | |
|---|---|---|---|
| 2,171,408 | 8/1939 | Smit | 252/422 |
| 2,996,359 | 8/1961 | Mossman | 423/415 A |
| 3,248,303 | 4/1966 | Doying | 252/422 X |
| 3,436,312 | 4/1969 | Leonor | 44/1 R |
| 3,575,884 | 4/1971 | Seiler | 423/449 X |
| 3,864,277 | 2/1975 | Kovach | 423/449 X |
| 3,940,344 | 2/1976 | Yokogawa | 423/449 X |

OTHER PUBLICATIONS

Cross et al., "The Combustion of Carbohydrates By Means of Chromic Acid", Chemical News, Oct. 23, 1885.

*Primary Examiner*—Earl C. Thomas
*Attorney, Agent, or Firm*—William S. Bernheim; Robert E. Krebs

[57] ABSTRACT

A process for producing carbon monoxide and synthetic coal by treating carbohydrates with acid in the absence of any appreciable gaseous oxygen.

8 Claims, 3 Drawing Figures

GRAPH I

GRAPH I

GRAPH II

CARBOHYDRATE CONVERSION TO CARBON MONOXIDE AND SYNTHETIC COAL

BACKGROUND OF THE INVENTION

In view of the fact that the natural reserves of coal, oil and other carbonaceous fossil fuels are limited, a number of efforts have been made to develop fuel products from alternative sources. For example, it has been proposed that sewage and organic wastes should be processed to produce methane, a burnable gas. To my knowledge, however, such efforts to develop alternative fuel sources have not focused on the production of fuel products, such as carbon monoxide, from cultivatable forms of carbohydrate substances, even though the natural rate of regeneration of such substances, for example grains, trees and seaweed is quite rapid.

Carbon monoxide is valuable both as a fuel substance and as a chemical reactant. That is, carbon monoxide may be burned as a fuel (it has one-third the heat content of natural gas) and its combustion does not produce water. In addition, carbon monoxide can be converted to methanol, gasoline, fertilizer, and other valuable products of commerce or used directly to generate electric power in fuel cells.

While it is well known that cellulose is soluble in sulfuric acid to form amyloid (vegetable parchment), it has not been recognized heretofore that the treatment of cellulose and other carbohydrates with acids, such as sulfuric acid, under certain conditions can produce fuel products, such as carbon monoxide, in substantial quantities, which is to mean, a gaseous output which is about 50% or more carbon monoxide.

SUMMARY OF THE INVENTION

The subject of this invention is a low energy process for converting carbohydrates to fuel in substantial quantities.

This invention comprises a process of treating carbohydrates with acid in the absence of any appreciable gaseous oxygen to produce substantial quantities of carbon monoxide gas and a "synthetic coal." The term synthetic coal is used here to mean a novel carbonaceous substance having coal-like properties. The synthetic coal produced can also be converted to produce substantial quantities of carbon monoxide. The reaction conditions can be varied to favor either the production of synthetic coal or carbon monoxide gas.

"Atmospheric synthetic coal" can also be produced by treating carbohydrates with acid in the presence of air. The term "atmospheric synthetic coal" is used in this application to mean a variation of synthetic coal produced in the presence of 10% or more oxygen in the gaseous phase, (i.e., in air).

It is believed the process of converting synthetic coal to carbon monoxide can also be utilized in the production of substantial quantities of carbon monoxide from naturally occuring coals such as anthracite, bituminous, subbituminous, and lignite coals.

BRIEF DESCRIPTION OF THE DRAWINGS

Further objects and advantages of the invention will be apparent from the following detailed description, taken in conjunction with the accompanying drawings. In the drawings.

DETAILED DESCRIPTION

Figure 1:
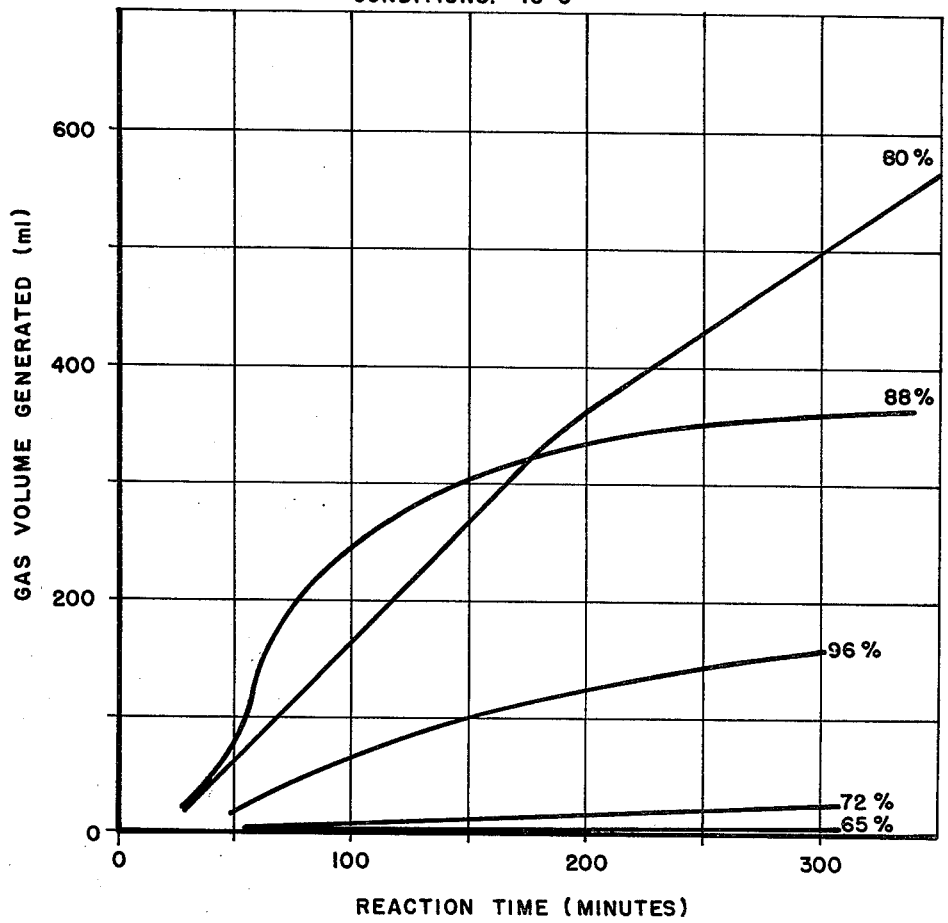
FIG. 1 depicts a Graph I which sets forth the effect of acid concentration on generation rate.
Figure 2:
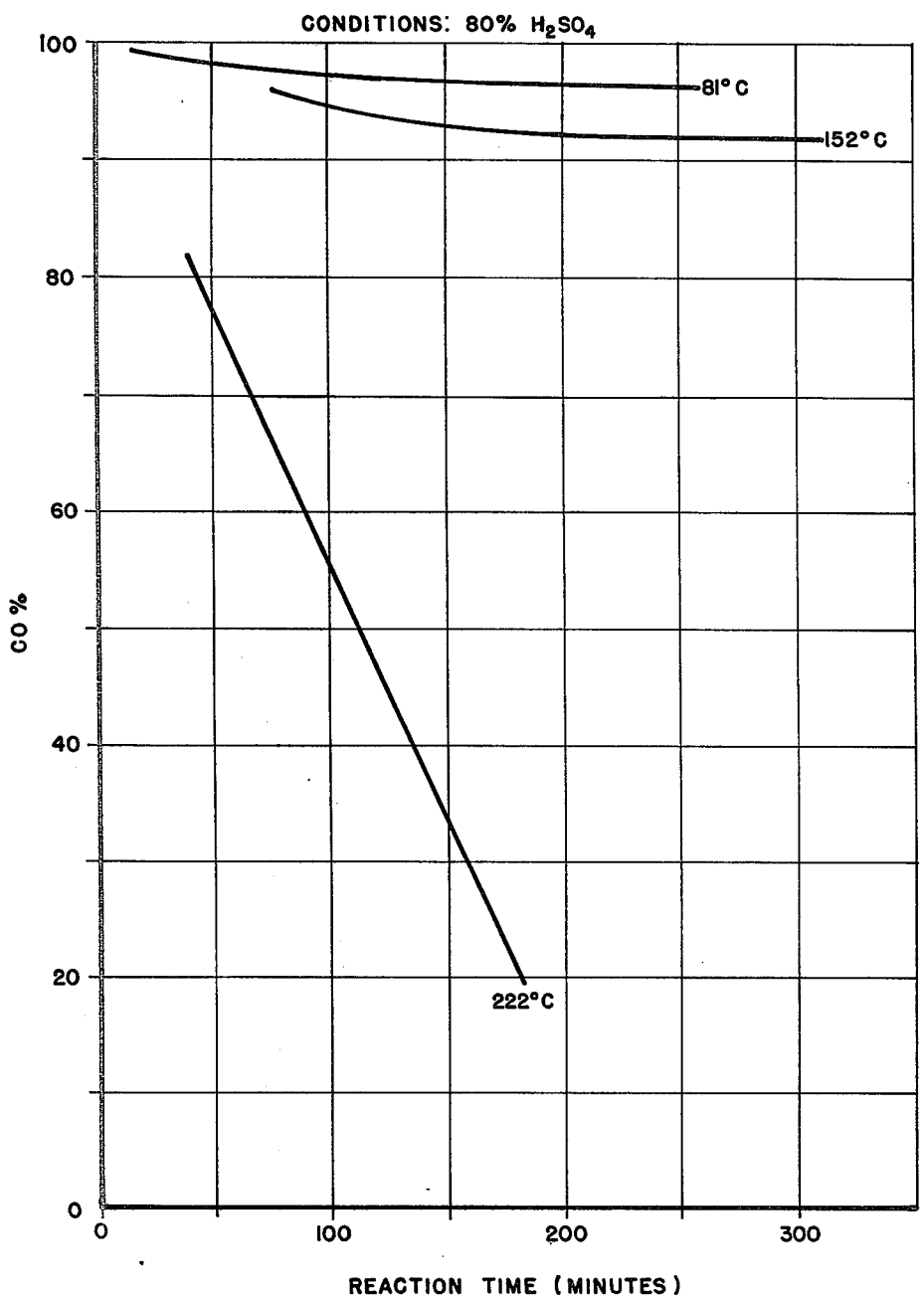
FIG. 2 depicts a Graph II which sets forth the effect of temperature on the oxidation rate of carbon monoxide.
Figure 3:
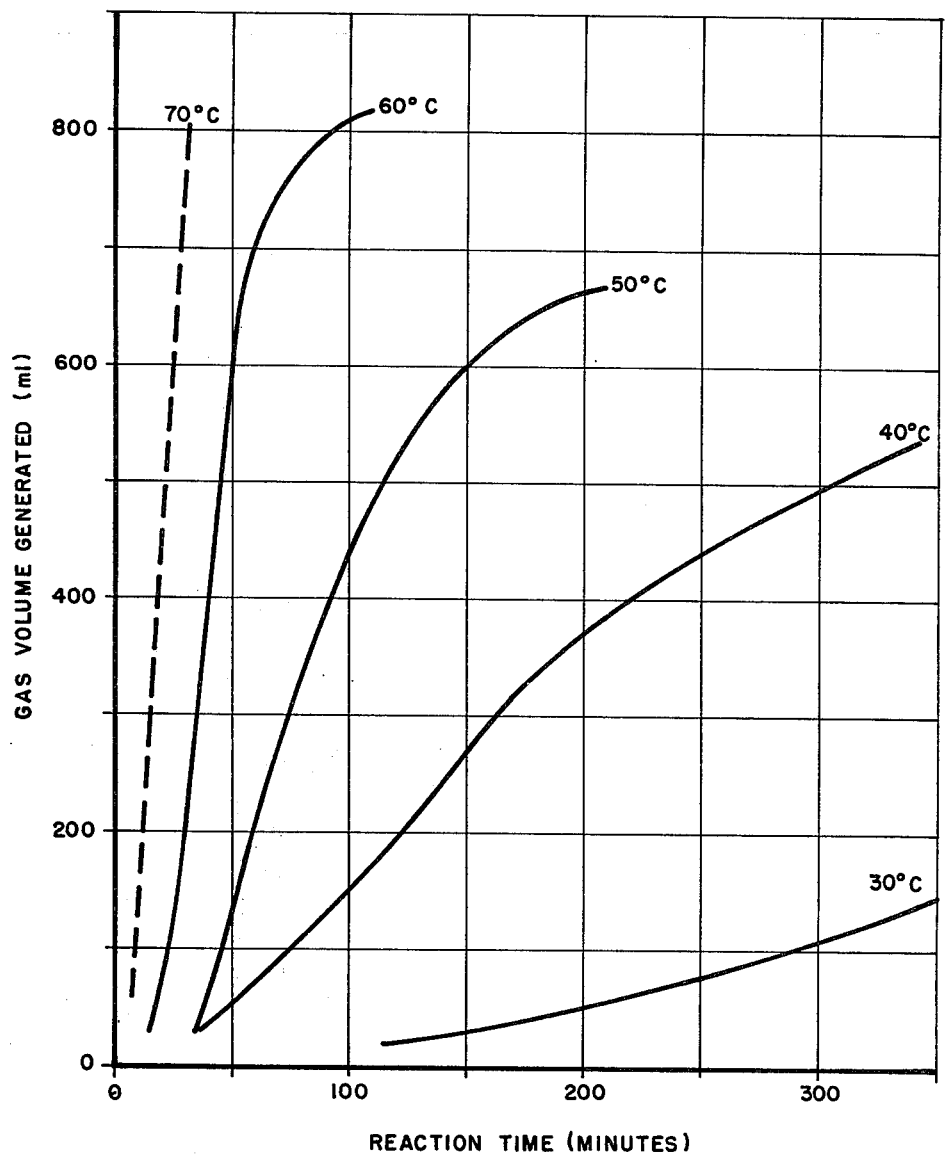
FIG. 3 depicts a Graph III which sets forth the effect of temperature on generation rate.

Essential to the operation of the process is the absence of any appreciable gaseous oxygen in the reaction zone. Lowering oxygen concentration below that normal in air increases carbon monoxide production. The concentration of oxygen in the gas phase must be below about 10% and preferably below about 1%.

Any carbohydrate can be utilized in the process of the invention. Some especially useful classes are celluloses, starches, monosaccharides and disaccharides. Preferred carbohydrate sources are chaff, grain hulls, straw, sugar cane, bagasse, seaweed, wood products, wood wastes, hemp and jute.

The following acids and acid mixtures are useful with this invention: sulfuric acid, sulfuric acid diluted in water, phosphoric acid, phosphoric acid diluted in water, mixtures of phosphoric and sulfuric acids, and mixtures of phosphoric acid and oxides of nitrogen. Mixtures of dehydrating acids and oxides of nitrogen are useful in producing carbon monoxide. Percentages cited hereafter are by weight.

Other important process variables include acid concentration, temperature and the molar ratio of acid to carbohydrate.

Acid concentration is defined at the time the reaction is initiated. Useful acid concentrations and temperatures depend on whether production of carbon monoxide or synthetic coal is to be favored.

Carbon monoxide generation from carbohydrate is favored by high concentrations of dehydrating acid, reduced gaseous oxygen concentration, and sufficient concentration of an oxidizing acid to oxidize some of the carbohydrate material to carbon monoxide. For mixtures of sulfuric acid and water, for example, acid concentrations of about 65–100% and preferably about 75–85%, are advantageously employed at temperatures between about 20° C. and 110° C. and preferably between about 50°–70° C. Temperature between about 20° C. and 110° C. allows about 4–6% of the initial weight of carbohydrate to yield high purity carbon monoxide gas. Temperatures between about 110° C. and 330° C. allow over 70% of the initial weight of carbohydrate to be converted to gas (carbon monoxide and carbon dioxide); this high temperature conversion gives best conversion fo sulfuric acid concentrations of about 80–100% and preferably about 90–96%.

Mixtures of sulfuric and phosphoric acids also produce good yields of carbon monoxide gas. Mixtures of about 5–100% sulfuric acid (with corresponding phosphoric acid amounts of 95–0%) and preferably about 20–35%, yield large quantities of carbon monoxide with temperatures between about 20° C. and 300° C., but preferably between about 100° C. and 300° C.

Synthetic coal generation is favored by high concentrations of a dehydrating acid and low concentrations of an oxidizing acid at temperatures over 100° C. For lower temperature generation, mixtures of sulfuric acid and water with acid concentrations of about 40–100% and preferably of about 50–60%, produce good yields of synthetic coal with temperatures between about 20° C. and 110° C. and preferably between about 50° C. and 70° C. Mixtures of sulfuric and phosphoric acids with sulfuric acid concentrations of about 0-100% (with corresponding phosphoric acid amounts of 100-0%) are also useful. Mixtures of about 80-100% phosphoric acid generate a "low sulfur" synthetic coal with temperatures between about 40° C. and 200° C., but preferably between about 100° C. and 130° C. Low sulfur synthetic coal means those synthetic coals which contain less than 0.1% sulfur.

The molar ratio of acid to carbohydrate is defined in terms of monomer units of carbohydrates. Carbohydrates such as celluloses and monosaccharides are based on the monomer units $C_6H_{10}O_5$ and $C_6H_{12}O_6$ respectively. Useful ratios for carbon monoxide production are between about 30-1 and 1-1 with a preferred ratio between about 20-1 and 10-1. Useful ratios for synthetic coal production are between 30-1 and 1-1 with a preferred ratio between about 12-1 and 5-1.

Percent conversion of the starting carbohydrate to carbon monoxide and synthetic coal is a function of the reaction conditions and the length of time the reaction is allowed to run. Typical conversion to gases is 5.5% for a carbohydrate sample when the sulfuric acid concentration is 80%, the temperature is 40° C., the molar ratio is 20-1, and the reaction time is five hours. Typical conversion is greater than 70% when the sulfuric acid concentration is 96%, the temperature is 300° C., the molar ratio is 20-1, and the reaction time is seven hours.

Removal of the carbon monoxide as produced from the presence of the reactants minimizes the oxidation of the carbon monoxide to carbon dioxide and, hence, is important to maximize output of carbon monoxide.

The presence of gaseous oxygen in the reaction zone is deleterious to the process of producing carbon monoxide from carbohydrates. That is so because the oxidation rate of carbon monoxide to carbon dioxide at gas-liquid interfaces and in the gas phase in the reaction zone is proportional to the amount of gaseous oxygen present in the reaction zone. Thus, this process should be carried out in the absence of gaseous oxygen or air (which contains about 20% oxygen). Gaseous oxygen in the reaction zone adversely affects the composition of the synthetic coal product insofar as it increases the oxygen content in the synthetic coal. Increased oxygen content will, in turn, decrease the heat which can be derived from the combustion of the synthetic coal.

One step which enhances rapid and complete conversion of carbohydrates to carbon monoxide and synthetic coal is the reduction of the physical size of the carbohydrates. Shredding effectively reduces the size while increasing the exposed surface area. This hastens their dissolution and increases the rate of product generation. Any conventional means of shredding can be utilized.

The order of reactant addition is not critical. Good mixing prevents local regions of high, nonhomogeneous reactant concentration, voids, and exotherms and assures a homogeneous product. Any conventional means of mixing can be utilized.

The gaseous products formed by the process at lower temperatures contain carbon monoxide, carbon dioxide, and small amounts of water vapor. At elevated temperatures the gaseous products can also contain acid gases such as sulfur dioxide. Removal of sulfur dioxide, for example, by scrubbing purifies the product and allows the acid reactant to be regenerated. The removed sulfur dioxide can, for example, be converted to sulfuric acid by treatment with gaseous oxygen in the presence of a heavy metal catalyst.

The invention process is adaptable to batch or continuous operation. A continuous operation would consist, for example, of transferring shredded carbohydrate, mixed with acid, to a digestion tank and then gently mixing and heating the mixture to form a liquid solution. The solution can subsequently be transferred to a reactor where products can be formed at elevated temperatures. For example, the solution can be pumped to a heated pipeline reactor which is held in a thermal gradient between the temperature of the digestion tank and the maximum desired temperature. The gases produced can be removed during the reaction. At the completion of the reaction, any solid residue can be separated from the acid and the acid treated for reuse. Sulfur dioxide, present in the product gases, can be removed by scrubbing, and sulfuric acid regenerated.

The effects of acid concentration on generation rate and of temperature on the oxidation rate of carbon monoxide and on the generation rate of gases are demonstrated in the following graphs. The data on which the graphs are based was obtained using the following apparatus and procedure. The apparatus consists of a 500 ml. reaction flask clamped in an oil heating bath on a combination heater magnetic stir plate, an attached 50 ml. gas buret, associated gas valves, and a vacuum pump. The flask is fitted with a two-hole stopper, and in each is placed a septum connector. One connector accepts a one-eighth inch Teflon tube from the gas buret, and the other is used as a gas sampling port.

Unless otherwise indicated, the work was conducted using Crown Bonus bleached single ply paper towels manufactured by the Crown Zellerback Corporation, San Francisco, California. Samples containing water are oven dried at 105° C. for several hours. The dry samples (16.2 g., containing 0.1 mole of the $C_6H_{10}O_5$ monomer unit) are shredded and placed in the 500 ml. reaction flask. A magnetic stir bar and 200 ml. of room-temperature sulfuric acid are added to the contents of the flask. The stopper assembly is put in place. All air is swept from the flask with a two minute purge of argon flowing at about 500 ml./min. The contents are stirred regularly to minimize carbonization and to assure complete sample degradation. The flask is clamped in the oil heating bath and heated to temperature. Intermittent stirring of the bath is required to maintain a fixed temperature. Temperature and gas volume readings were recorded regularly.

At the completion of the gas generation step the flask is removed from the bath and opened, and its contents poured into five or six volumes of deionized water. The dark solid residual product is filtered, washed with water, and dried at 105° C. in air. The residue is synthetic coal and some ash.

Graph I demonstrates the effect of acid concentration on the generation rate when the reaction is run at 40° C. The molar ratio of sulfuric acid to carbohydrate was kept above 10 to 1. For each run, a 0.1 mole sample of paper towel was treated with sulfuric acid of the indicated concentration.

At sulfuric acid concentrations of less than 60% in water, no gas is generated. For a 96% acid concentration, less than 2 mole percent or 160 ml. of gas is generated at 40° C. Acid concentrations in the range of 80% prove to be the most useful in the production of carbon monoxide. At 80% the rate for the first 400 ml. was 2.1 ml./min, while the rate between 400 ml. and 800 ml. of gas was 1.3 ml./min. At 96% acid the generation was quite slow but essentially the same as the rate for 88% acid after four hours of reaction time. The initial rate for the 88% acid was nearly 5 ml./min, but rapidly decayed to the slower rate of 0.2 ml./min.

An average composition for the gas generated at 40° C. and 80% sulfuric acid was 93.5% CO, 3.8% $CO_2$, 0.08% $SO_2$, and 2.6% $H_2O$. By correcting for the sulfur dioxide and water vapor, the dry gas composition becomes 96.1% CO and 3.9% $CO_2$.

At the beginning of the gas generation, the carbon monoxide accounts for essentially all the gas generated. As the reaction time reaches five hours, the composition of the dry gas shifts to approximately 93% CO and 7% $CO_2$.

Graph II demonstrates the effect of temperature on carbon monoxide oxidation to carbon dioxide when a sulfuric acid concentration of 80% is used. The effect was determined by the following procedure. It is assumed that carbon monoxide and carbon dioxide represent the total gaseous output. Sufficient formic acid is added to cold, concentrated sulfuric acid to produce 80% sulfuric acid and carbon monoxide (in argon) when the temperature is increased to 40° C. The results show a tendency of the gas mixture in relatively short reaction times to attain equilibrium concentrations of about 95% carbon monoxide at 81° C. and about 90% carbon monoxide at 152° C. At 222° C. the concentration of carbon monoxide decreases rapidly and would probably become nearly pure carbon dioxide at that temperature. Continuous removal of the gaseous products can be used to obtain a high purity product.

Graph III demonstrates the effect of temperature over the range of 30°–70° C. when a sulfuric acid concentration of 80% is used. The graph shows that higher temperatures rapidly increase the generation rate.

Several reaction schemes are possibly competing, depending on the acid concentration. Addition of 96% sulfuric acid to shredded paper towel causes the solid to become black in color within five minutes at 40° C. It is believed that the black coloration is due to the acid acting primarily as a dehydrating agent to promote a reaction such as conversion of carbohydrate to char and water. As soon as sufficient water is produced to dilute the acid, it can no longer drive this reaction. In addition, the charred cellulose may occlude unreacted material to further slow the overall reaction rate.

80% sulfuric acid acts as both an oxidizing and dehydrating agent. While it is important to reduce the dehydrating capacity, and thus, the charring tendency of the acid, dilution of the acid strength also decreases the oxidation capacity of the medium. These two characteristics can be separated by using an acid mixture of 15% sulfuric and 85% phosphoric acid. The phosphoric acid acts as the dehydrating agent and the sulfuric acid acts as the oxidizing agent.

Following are six examples. In the first and second examples, carbohydrate is converted to carbon monoxide with sulfuric acid at low temperature. In the third example, carbohydrate is converted to carbon monoxide with sulfuric acid at high temperature. In the fourth example carbohydrate is converted to low sulfur synthetic coal with phosphoric acid. In the fifth example, carbohydrate is converted to synthetic coal with sulfuric acid, and in the sixth example synthetic coal is converted to carbon monoxide with sulfuric acid.

EXAMPLE 1

Dried, bleached paper towels (16.2 g., which is 0.1 mole of the $C_6H_{10}O_5$ monomer unit) are shredded and placed in a 500 ml. flask. A Teflon coated magnetic stir bar and 200 ml. of 80% sulfuric acid are added to the contents of the flask. Air is swept from the flask by purging for two minutes with argon at a flow rate of about 500 ml./min. The mixture is stirred at a moderate rate and heated to 40±2° C. More than 800 ml. of practically pure (93.5% CO, 3.8% $CO_2$, 0.8% $SO_2$, 2.6% $H_2O$) carbon monoxide gas is generated in approximately five hours.

EXAMPLE 2

Dried, bleached paper towels (16.2 g.) are shredded and placed in a 500 ml. flask. A Teflon coated magnetic stir bar and 200 ml. of 50% sulfuric acid (a mixture of 104 ml. of 96% sulfuric plus 96 ml. of 85% phosphoric acid) are added. Air is swept from the flask by purging for two minutes with argon at a flow rate of about 500 ml./min. The mix is stirred and heated to 60±2° C. Approximately 900 ml. of practically pure (84% CO, 16% $CO_2$, and unmeasured water and $SO_2$) carbon monoxide is produced in about six hours.

EXAMPLE 3

Dry, bleached paper towels (16.2 g.) are shredded and placed in a 500 ml. flask. A magnetic stir bar and 200 ml. of 96% sulfuric acid, cooled to 12° C., are added. Air is swept from the flask by purging for two minutes with argon at a flow rate of about 500 ml./min. The mix is stirred and heated to 300° C. over a 2½ hour period. During a total 7 and ⅓ hour period, 10.5 liters of carbon monoxide and carbon dioxide gas were generated, representing better than 70% conversion of starting material to gas. The carbon monoxide represents more than 50% of the gaseous output.

EXAMPLE 4

Dried, bleached paper towels (16.2 g.) are shredded and placed in a 500 ml. flask with 150 ml. of 85% phosphoric acid. The mixture is heated to 120° C. for two hours and the contents are then poured into 1000 ml. of water. Solid, low sulfur synthetic coal is collected by filtration through acid washed filter paper, flushed with more water and dried at 110° C. for two hours. The residue can be formed into briquettes while drying. The resulting low sulfur synthetic coal contained less than 0.01% sulfur.

EXAMPLE 5

Dried paper towels (16.2 g.) are shredded and placed in a 500 ml. flask. A Teflon coated magnetic stir bar and 200 ml. of 80% sulfuric acid are added to the contents of the flask. The mixture is stirred and heated to 60° C. for two hours. The mixture is then cooled to room temperature and poured into one liter of water, filtered, rinsed, and dried at 110° C. for four hours. An elemental analysis of the synthetic coal yielded 61.5% carbon, 3.4% hydrogen, 4.5% sulfur, 22.2% oxygen, and 8.4% ash.

EXAMPLE 6

Dry synthetic coal (9.1 g.), a Teflon coated magnetic stir bar, and 150 ml. of 96% sulfuric acid are placed in a 500 ml. flask. The contents of the flask are stirred and heated to 250° C. for a period of four hours. A total of 5010 ml. of carbon monoxide and carbon dioxide gases were collected in that period of time of which more than 50% is carbon monoxide.

I claim:

1. A process of producing substantial amounts of carbon monoxide which comprises:
   a. mixing carbohydrates with an acid selected from sulfuric and sulfuric diluted in water with a concentration of sulfuric acid between about 65% and 100% at the time the reaction is initiated, in the absence of a gaseous phase having an oxygen concentration above about 10% and at a temperature between about 20° C. and 110° C. and wherein the molar ratio of sulfuric acid to monomer carbohydrate units is between about 30-1 and 1-1;
   b. recovering carbon monoxide from the gases generated by the mixing.

2. A process according to claim 1 wherein the sulfuric acid concentration is between about 75% and 85% at the time the reaction is initiated, the temperature is between about 50° C. and 70° C. and the molar ratio of sulfuric acid to monomer carbohydrate units is between about 20-1 and 10-1.

3. A process of producing substantial amounts of carbon monoxide which comprises:
   a. mixing carbohydrates with an acid selected from sulfuric and sulfuric diluted in water with a concentration of sulfuric acid between about 80% and 100% at the time the reaction is initiated, in the absence of a gaseous phase having an oxygen concentration above about 10% and at a temperature between about 110° C. and 330° C. and wherein the molar ratio of sulfuric acid to monomer carbohydrate units is between about 30-1 and 1-1;
   b. recovering carbon monoxide from the gases generated by the mixing.

4. A process according to claim 3 wherein the sulfuric acid concentration is between about 90% and 96% at the time the reaction is initiated and the molar ratio of sulfuric acid to monomer carbohydrate units is between about 20-1 and 10-1.

5. A process of producing substantial amounts of carbon monoxide which comprises:
   a. mixing carbohydrates with an acid mixture of phosphoric and sulfuric acid which is 5% to 100% sulfuric by weight, in the absence of a gaseous phase having an oxygen concentration above about 10% and at a temperature between about 20° C. and 300° C. and wherein the ratio of acid to monomer carbohydrate units is between about 30-1 and 1-1;
   b. recovering carbon monoxide from the gases generated by the mixing.

6. A process according to claim 5 wherein the acid mixture is 20% to 35% sulfuric by weight.

7. A process according to claim 5 wherein the temperature is between about 100° C. and 300° and the molar ratio of acid to monomer carbohydrate units is between about 20-1 and 10-1.

8. A process according to claim 6 wherein the temperature is between about 100° C. and 300° C. and the molar ratio of acid to monomer carbohydrate units is between about 20-1 and 10-1.

* * * * *